(12) United States Patent
Rofougaran

(10) Patent No.: US 7,979,043 B2
(45) Date of Patent: Jul. 12, 2011

(54) PROGRAMMABLE ANTENNA INTERFACE WITH ADJUSTABLE TRANSFORMER AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 895 days.

(21) Appl. No.: 11/946,433

(22) Filed: Nov. 28, 2007

(65) Prior Publication Data

US 2009/0137215 A1    May 28, 2009

(51) Int. Cl.
*H04B 1/18* (2006.01)

(52) U.S. Cl. ......... 455/292; 455/107; 455/313; 455/73; 336/200; 336/170; 257/531; 29/605; 343/850

(58) Field of Classification Search ................. 455/292, 455/296, 313, 318, 73, 107; 336/200, 170, 336/232, 192, 223; 257/531, 528; 29/605, 29/602.1, 606; 343/850, 749; 327/356
See application file for complete search history.

(56) References Cited

U.S. PATENT DOCUMENTS

| | | | |
|---|---|---|---|
| 6,429,763 B1 * | 8/2002 | Patel et al. | 336/200 |
| 6,476,704 B2 * | 11/2002 | Goff | 336/200 |
| 6,577,219 B2 * | 6/2003 | Visser | 336/200 |
| 6,580,334 B2 * | 6/2003 | Simburger et al. | 333/24 R |
| 6,608,364 B2 * | 8/2003 | Carpentier | 257/531 |
| 6,707,367 B2 * | 3/2004 | Castaneda et al. | 336/200 |
| 6,919,858 B2 * | 7/2005 | Rofougaran | 343/850 |
| 7,010,286 B2 * | 3/2006 | Sorrells et al. | 455/313 |
| 7,039,381 B2 * | 5/2006 | Yang et al. | 455/292 |
| 7,095,307 B1 * | 8/2006 | Barrett et al. | 336/200 |
| 7,119,647 B2 * | 10/2006 | Park | 336/84 C |
| 7,170,465 B2 * | 1/2007 | Rofougaran | 343/850 |
| 7,253,712 B1 * | 8/2007 | Papananos | 336/200 |
| 7,346,979 B2 * | 3/2008 | Park | 29/605 |
| 7,456,721 B2 * | 11/2008 | Chiu | 336/200 |
| 7,482,904 B2 * | 1/2009 | Lee et al. | 336/200 |
| 7,489,221 B2 * | 2/2009 | Barrett et al. | 336/200 |
| 7,526,256 B2 * | 4/2009 | Bhatti et al. | 455/73 |
| 7,750,787 B2 * | 7/2010 | Yoon et al. | 336/223 |
| 2010/0237974 A1 * | 9/2010 | Yoon et al. | 336/170 |

* cited by examiner

*Primary Examiner* — Temesgh Ghebretinsae
*Assistant Examiner* — April G Gonzales
(74) *Attorney, Agent, or Firm* — Garlick Harrison & Markison; Bruce E. Stuckman

(57) ABSTRACT

A programmable antenna interface for coupling an antenna to a transceiver having a receiver section and a transmitter section, includes a transformer that is adjustable in accordance with a control signal. A transmit/receive module couples the transformer to the receiver section in a receive mode and to the transmitter section in a transmit mode. The control signal controls the transformer to a first impedance in the transmit mode and controls the transformer to a second impedance in the receive mode.

17 Claims, 10 Drawing Sheets

US 7,979,043 B2

PROGRAMMABLE ANTENNA INTERFACE WITH ADJUSTABLE TRANSFORMER AND METHODS FOR USE THEREWITH

BACKGROUND OF THE INVENTION

1. Technical Field of the Invention

This invention relates generally to wireless communications systems and more particularly to radio transceivers used within such wireless communication systems.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Many wireless communication systems include receivers and transmitters that can operate over a range of possible carrier frequencies. Antennas are typically chosen to likewise operate over the range of possible frequencies, obtaining greater bandwidth at the expense of lower gain. Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
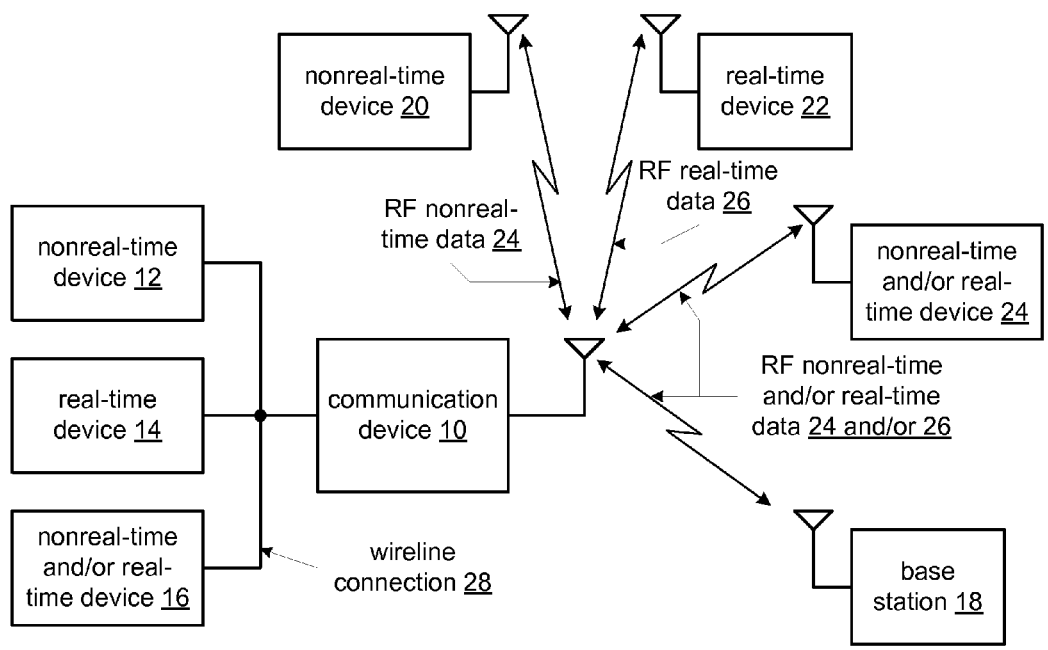
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-realtime device 20, real-time device 22, and non-real-time and/or real-time device 24. In addition, communication device 10 can also optionally communicate over a wireline connection with non-real-time device 12, real-time device 14, non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14, 16, 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes a circuit, such as a combined voice, data and RF integrated circuit that includes one or more features or functions of the present invention. Such circuits shall be described in greater detail in association with FIGS. 3-10 that follow.

Figure 2:
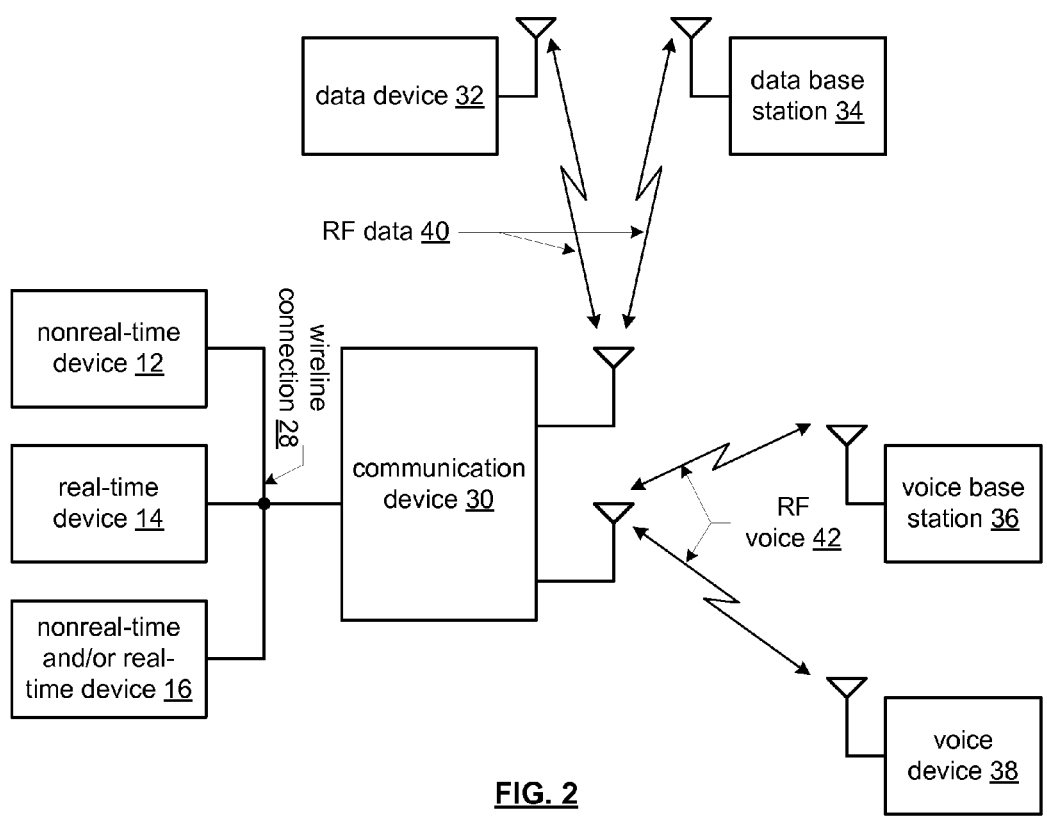
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
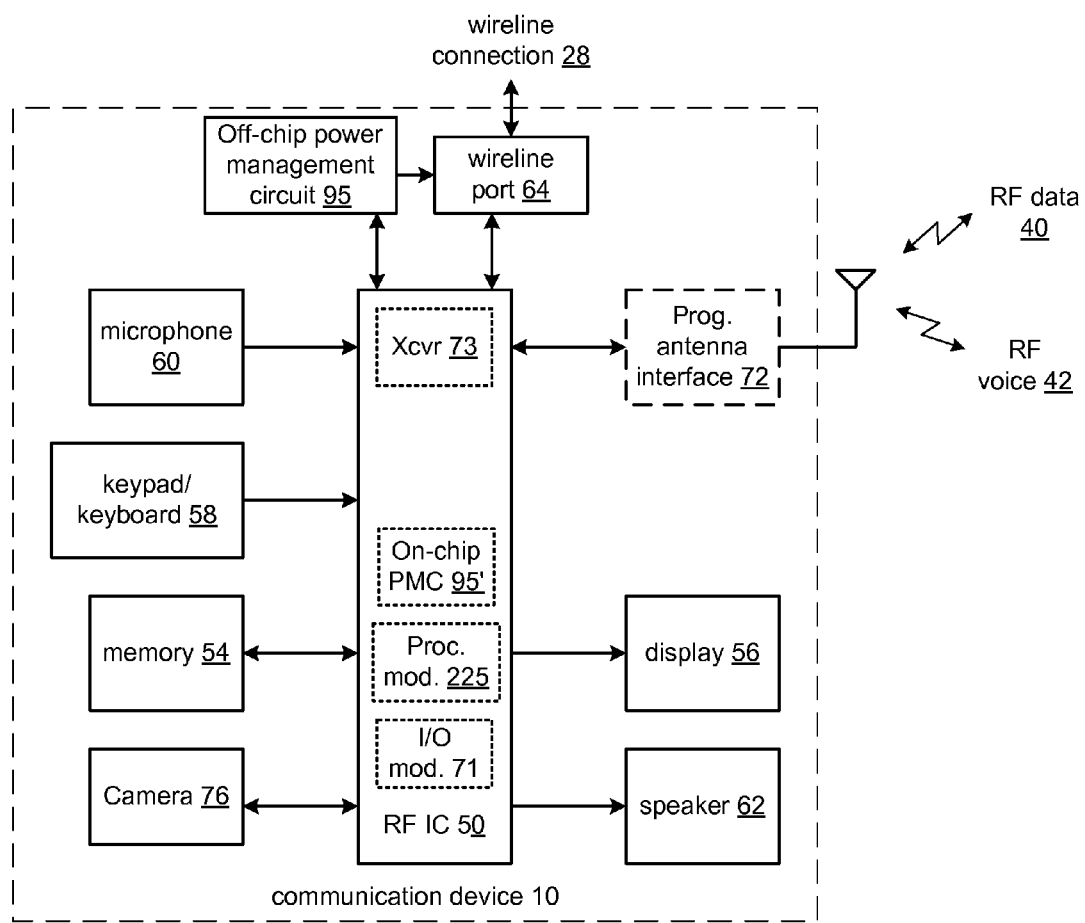
FIG. 3 is a schematic block diagram of an embodiment of a circuit in accordance with the present invention.

FIG. 3 is a schematic block diagram of an embodiment of a circuit in accordance with the present invention. In particular, an RF integrated circuit (IC) 50 is shown that implements communication device 10 in conjunction with microphone 60, keypad/keyboard 58, memory 54, speaker 62, display 56, camera 76, optional antenna interface 52 and wireline port 64. In addition, RF IC 50 includes a transceiver 73 with RF and baseband modules for formatting and modulating data into RF real-time data 26 and non-real-time data 24 and transmitting this data via a programmable antenna interface 72 that includes on-chip or on-package components and optional off-chip components and also via an antenna. Further, RF IC 50 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the RF IC 50 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the RF IC 50. RF IC 50 optionally includes an on-chip power management circuit 95' for replacing the off-chip power management circuit 95.

In an embodiment of the present invention, the RF IC 50 is a system on a chip integrated circuit that includes at least one processing device. Such a processing device, for instance, processing module 225, may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the processing module 225 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the RF IC 50 executes operational instructions that implement one or more of the applications (real-time or non-real-time) attributed to communication devices 10 and 30 as discussed in conjunction with FIGS. 1 and 2. Further, RF IC 50 includes one or more components of a programmable antenna interface 72 in accordance with the present invention that will be discussed in greater detail in association with FIGS. 5-10.

Figure 4:
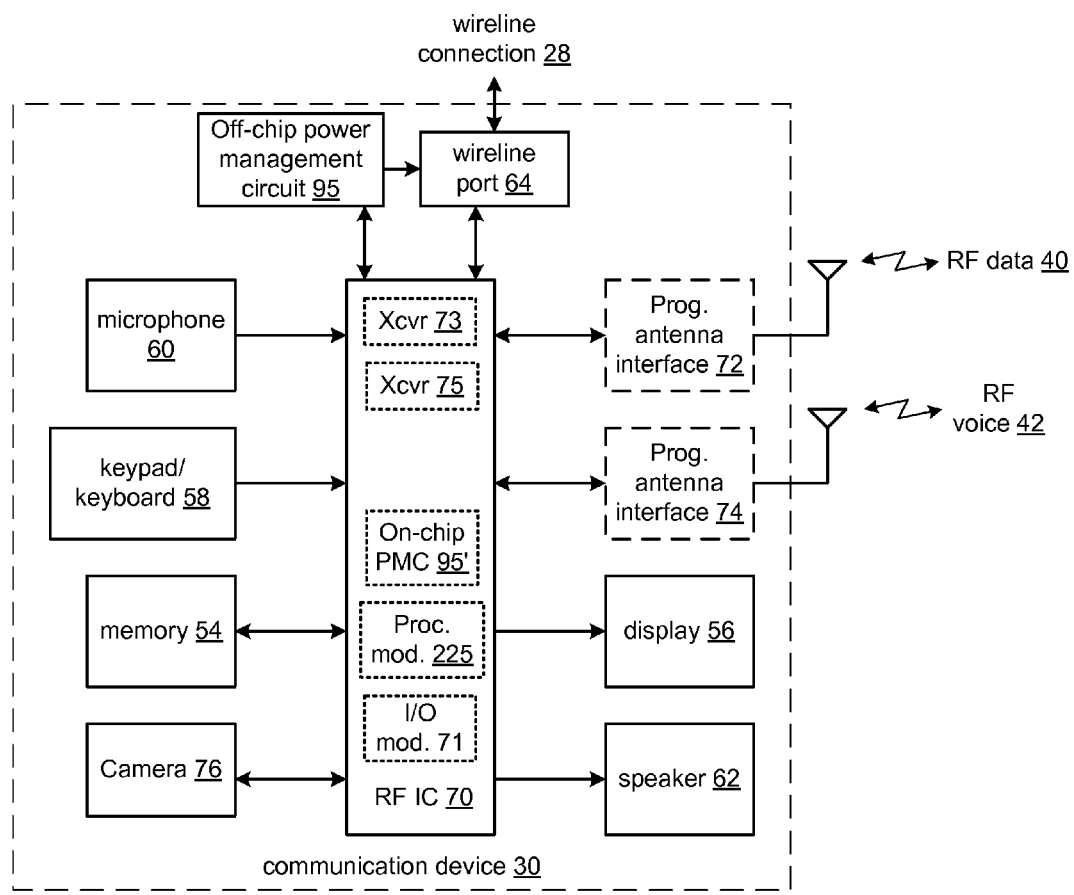
FIG. 4 is a schematic block diagram of another embodiment of a circuit in accordance with the present invention.

FIG. 4 is a schematic block diagram of another embodiment of an integrated circuit in accordance with the present invention. In particular, FIG. 4 presents a communication device 30 that includes many common elements of FIG. 3 that are referred to by common reference numerals. RF IC 70 is similar to RF IC 50 and is capable of any of the applications, functions and features attributed to RF IC 50 as discussed in conjunction with FIG. 3. However, RF IC 70 includes two separate wireless transceivers 73 and 75 for communicating, contemporaneously, via two or more wireless communication protocols via RF data 40 and RF voice signals 42.

In operation, the RF IC 70 executes operational instructions that implement one or more of the applications (real-time or non-real-time) attributed to communication device 10 as discussed in conjunction with FIG. 1. Further, RF IC 70 includes one or more components of a programmable antenna interface 72 and/or 74 in accordance with the present invention that will be discussed in greater detail in association with FIGS. 5-10.

Figure 5:
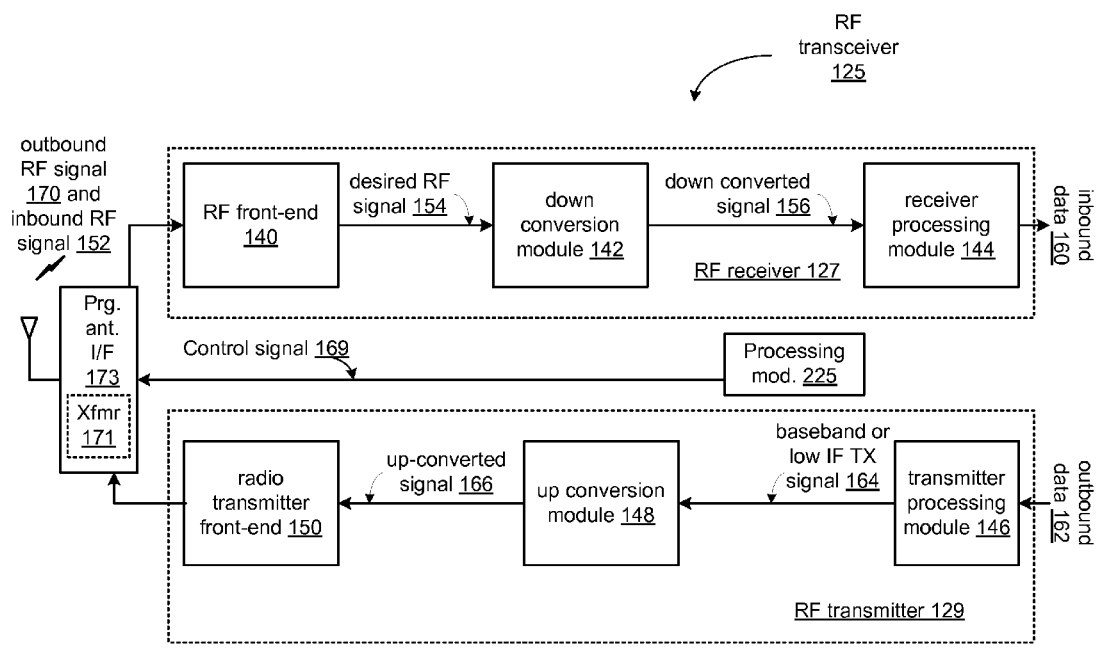
FIG. 5 is a schematic block diagram of an embodiment of a RF transceiver in accordance with the present invention.

FIG. 5 is a schematic block diagram of a RF transceiver in accordance with an embodiment of the present invention. The RF transceiver 125 includes an RF transmitter 129, an RF receiver 127 and a processing module. The RF receiver 127 includes a RF front end 140, a down conversion module 142, and a receiver processing module 144. The RF transmitter 129 includes a transmitter processing module 146, an up conversion module 148, and a radio transmitter front-end 150.

As shown, the receiver and transmitter are each coupled to a programmable antenna interface 173, such as programmable antenna interface 72 or 74, that includes a transformer 171 and share a single antenna or multiple antenna structure that includes two or more antennas or antenna elements. In particular, transformer 171 is adjustable via control signal 169 to a first impedance when the RF transceiver 125 is in the transmit mode to provide a desired load for the radio transmitter front end 150 and to a second impedance when the RF transceiver 125 is in the receive mode to match the impedance of RF receiver front-end 140.

In operation, the transmitter receives outbound data 162 from an application or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation.

The radio transmitter front end 150 includes a power amplifier 84 and may also include a transmit filter module. The power amplifier amplifies the up converted signals 166 to produce outbound RF signals 170, which may be filtered by the transmitter filter module, if included. The antenna, via the programmable antenna interface 173, transmits the outbound RF signals 170 to a targeted device such as a RF tag, base station, an access point and/or another wireless communication device.

The receiver receives inbound RF signals 152 via the antenna and programmable antenna interface 173, from a base station, an access point, or another wireless communication device. The programmable antenna interface 173, which will be described in greater detail in the figures that follow, provides the inbound RF signals 152 to the receiver front-end 140.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Processing module 225 generates control signal 169 having different values or format based on whether the RF transceiver 125 is in a transmit mode or a receive mode. Control signal 169 is operable, based on the particular implementation of programmable antenna interface 173 and, in particular transformer 171, to adjust the transformer 171 to a first impedance in the transmit mode and a second impedance in the receive mode. In an embodiment of the present invention, processing module 225 includes a processing module that performs various processing steps to implement the functions and features described herein. Such a processing module can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the control module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Further details regarding the programmable antenna interface 173 including various implementations and optional features are presented in conjunction with the FIGS. 6-10 that follow.

Figure 6:
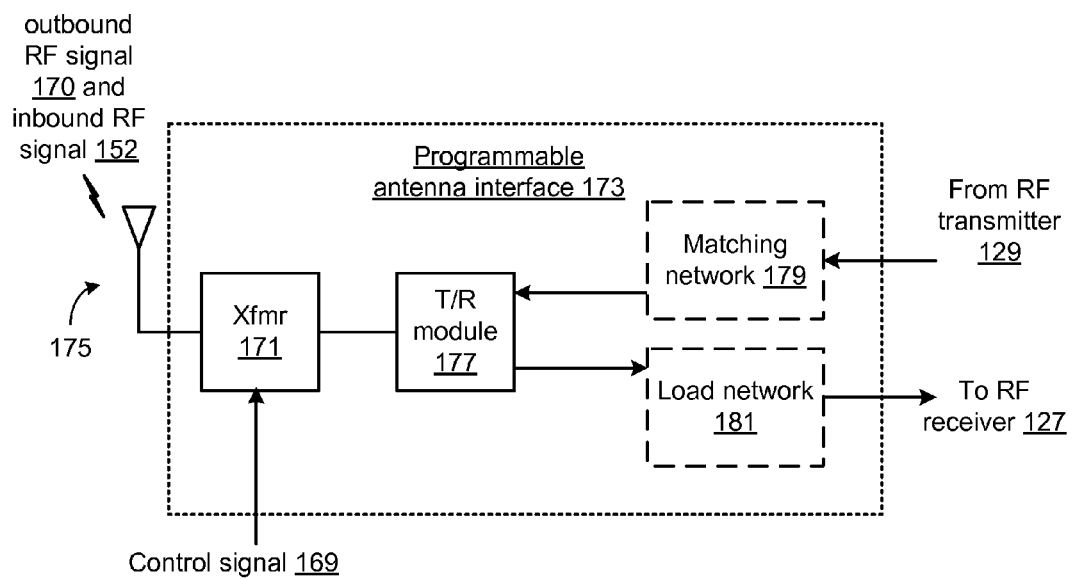
FIG. 6 is a schematic block diagram of an embodiment of a programmable antenna interface in accordance with the present invention.

FIG. 6 is a schematic block diagram of an embodiment of a programmable antenna interface in accordance with the present invention. In particular, programmable antenna interface 173 includes a transformer 171, coupled to the antenna 175, that is adjustable in accordance with a control signal 169. Transmit/receive module 177, such as a transmit receive switch, diplexer or other network that, in a receive mode, couples the transformer 171 to a receiver section, such as RF front end 140 of RF receiver 127 and to a transmitter section, such as radio transmitter front-end 150 of RF transmitter 179 in a transmit mode. As discussed, the control signal 169 controls the transformer 171 to a first impedance in the transmit mode and controls the transformer to a second impedance in the receive mode.

Programmable antenna interface 173 optionally includes matching network 179 and load network 181 that each includes one or more reactive network elements or other network elements to assist transformer 171 in matching the impedance of RF front end 140 in receive mode and the load impedance of radio transmitter front end 150 in the transmit mode. In an alternative embodiment, the transformer 171 operates to provide a desired impedance of RF front end 140 and a desired load to the radio transmitter front end 150, without the necessity of separate matching network 179 and/or load network 181. The desired load can be determined by minimizing standing wave ratio, increasing power transfer to the antenna 175 and or other impedance matching or control. The desired impedance can similarly be determined to increase power transfer and efficiency in transferring the inbound RF signal 152 to the RF front end 140 by impedance matching or other control.

In an embodiment of the present invention, all of the components of programmable antenna interface 173 are implemented in RF IC 50 or 70, however, other non-integrated implementations are possible. In particular, while optional matching network 179 and load network 181 can be implemented using on-chip inductors and capacitors or other elements, or implemented with off-chip components, if these optional networks are included.

Figure 7:
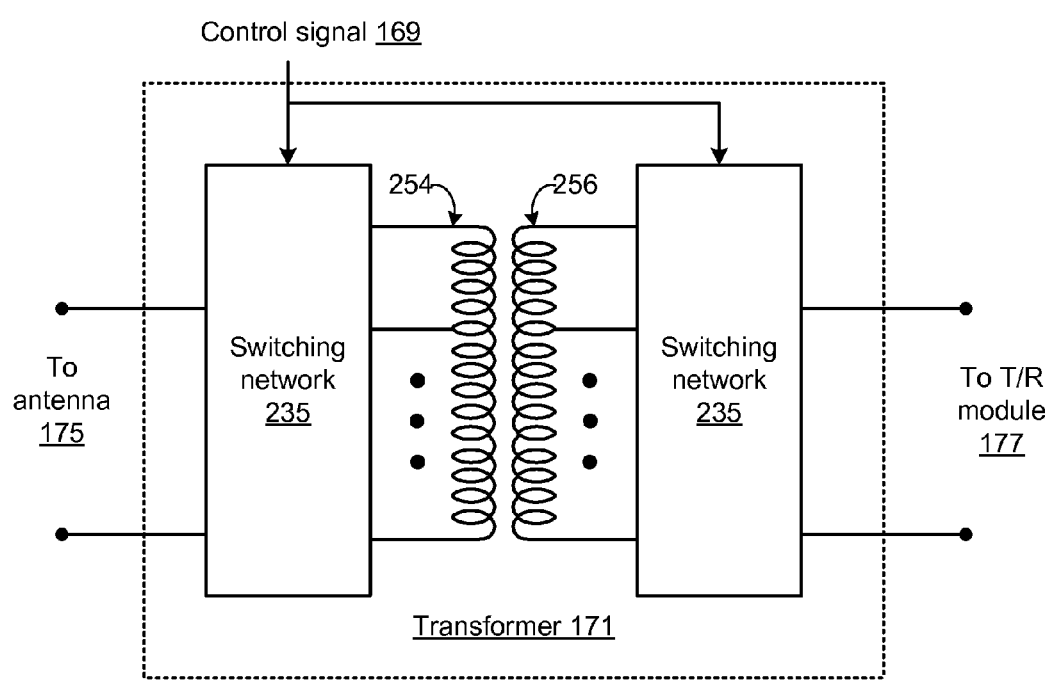
FIG. 7 is a schematic block diagram of an embodiment of an adjustable transformer in accordance with the present invention.

FIG. 7 is a schematic block diagram of an embodiment of an adjustable transformer in accordance with the present invention. In particular, transformer 171 is an on-chip or in-package transformer that can be implemented on RF integrated circuit 50 or 70, includes a winding 254 having a plurality of taps and a switching network 235 that couples the winding 254 to a port coupled to antenna 175 via a selected proper subset of the plurality of first taps. Further, winding 256, magnetically coupled to winding 254, can also have a plurality of taps that are selected by switching network 235 to provide a port to T/R module 177.

In particular, control signal 169 commands switching network 235 to select the particular subset of taps coupled to the antenna 175 and the subset of taps coupled to T/R module 177 to vary the impedance, transfer function, and other properties of the transformer 171, control the load on radio transmitter front-end 150 and the impedance seen by RF front-end 140. Transformer 171 can be single-sided to single-sided, or single-sided to differential. The port to the antenna 175 and the port to T/R module 177 can be balanced or unbalanced. The transformer 171 can be configured as an adjustable balun or in another configuration.

Figure 8:
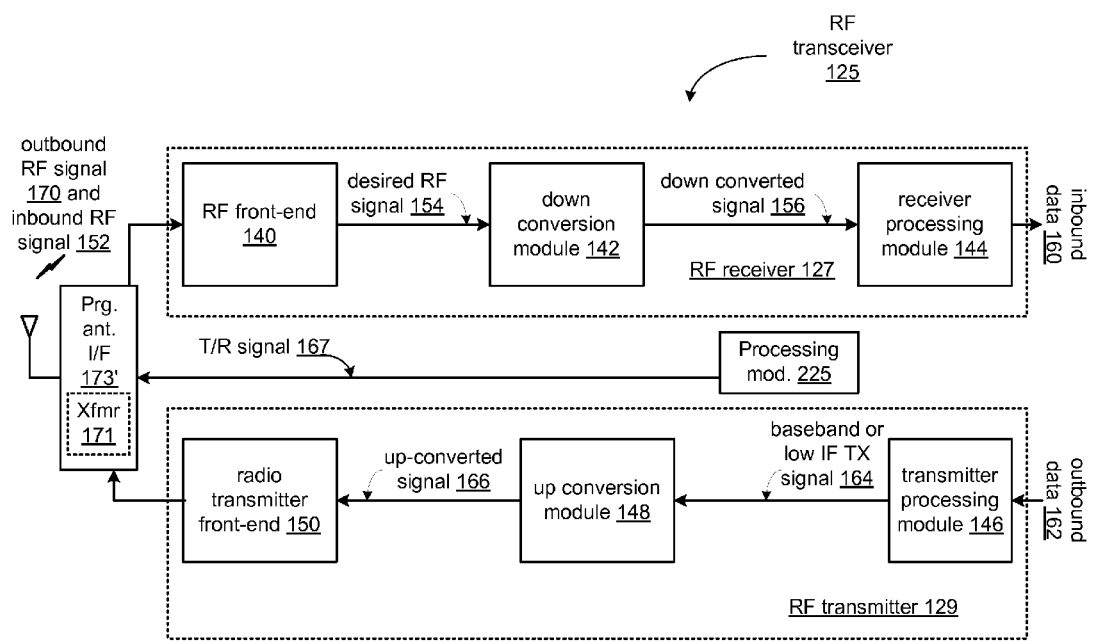
FIG. 8 is a schematic block diagram of an embodiment of another RF transceiver in accordance with the present invention.

FIG. 8 is a schematic block diagram of an embodiment of another RF transceiver in accordance with the present invention. In particular, RF transceiver 125' includes many similar elements to RF transceiver 125 that are referred to by common reference numerals. In this implementation, programmable antenna interface 173' responds to transmit/receive signal 167 generated by processing module 225 that has one value when the transceiver 125' is in the transmit mode and another value when transceiver 125' is in the receive mode.

Figure 9:
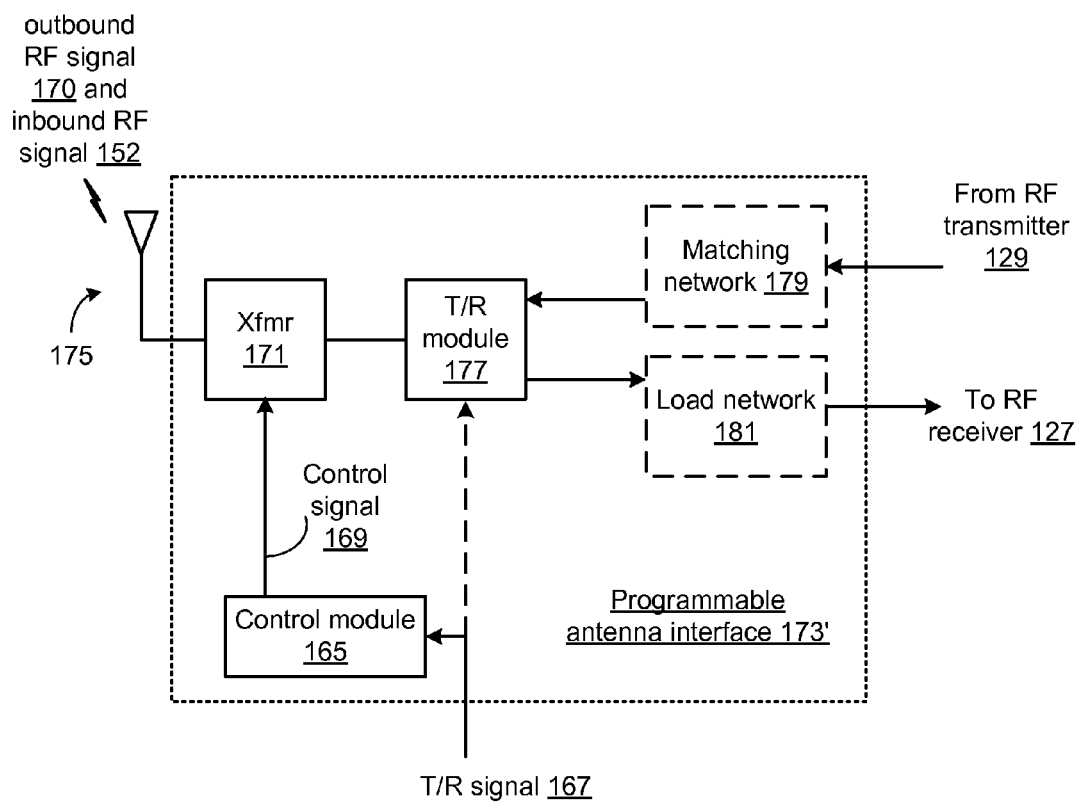
FIG. 9 is a schematic block diagram of an embodiment of another programmable antenna interface in accordance with the present invention.

FIG. 9 is a schematic block diagram of an embodiment of another programmable antenna interface in accordance with the present invention. In particular, programmable antenna interface 173' includes many similar elements to programmable antenna interface 173 that are referred to by common reference numerals. In this embodiment, control module 165 includes logic gates or other hardware, software or firmware to translate T/R signal 167 into control signal 169 used in transformer 171. When T/R module 177 includes a transmit/receive switch, T/R signal 167 can further be coupled to control the switching of the transmit/receive switch.

Figure 10:
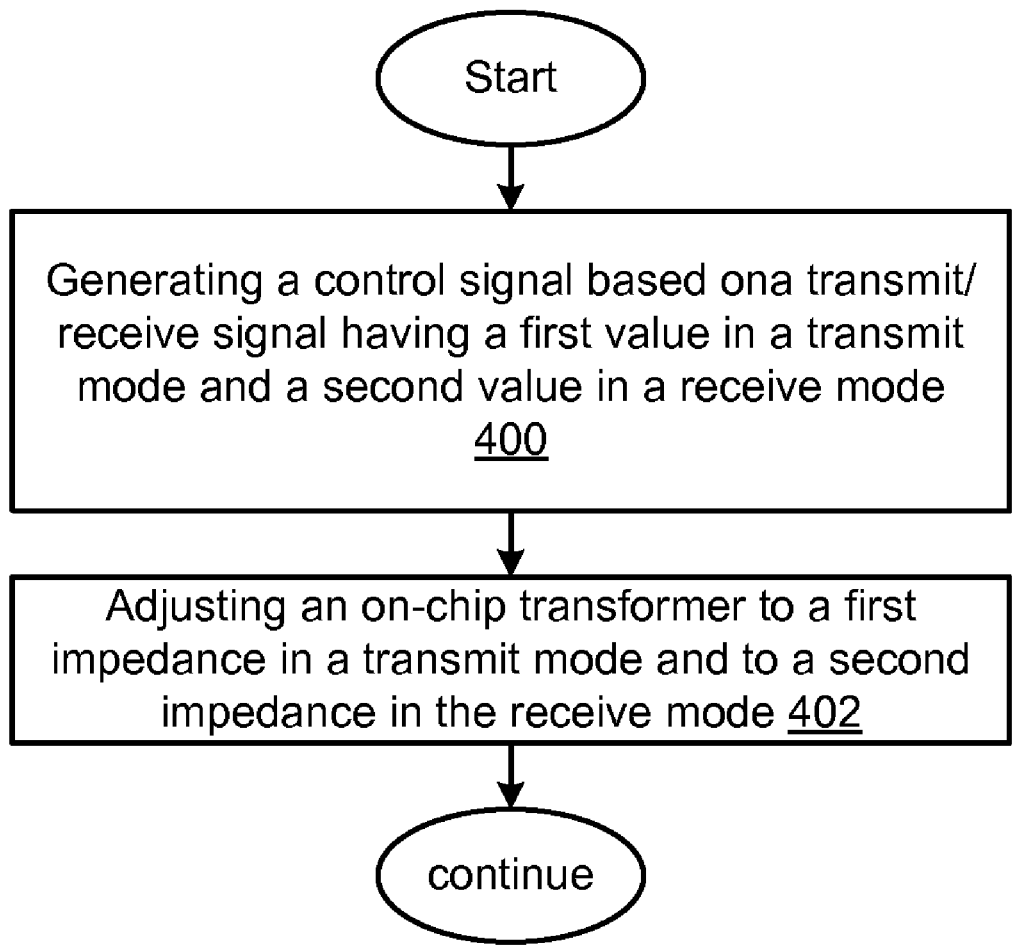
FIG. 10 is a flowchart representation of a method in accordance with an embodiment of the present invention.

FIG. 10 is a flowchart representation of a method in accordance with an embodiment of the present invention. In particular a method is presented for use in conjunction with any of the features and functions described in conjunction with FIGS. 1-9. In step 400, a control signal is generated based on a transmit/receive signal having a first value in a transmit mode and a second value in a receive mode. In step 402, an on-chip transformer is adjusted to a first impedance in the transmit mode and to a second impedance in the receive mode.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An integrated circuit (IC) comprising:
   an antenna;
   a receiver section;
   a transmitter section; and
   programmable antenna interface for coupling an antenna to a transceiver that includes a receiver section and a transmitter section, the programmable antenna interface comprising:
   a transformer, coupled to the antenna, that is adjustable in accordance with a control signal, wherein the transformer includes:
   a first winding having a plurality of first taps;
   a switching network that couples the first winding to a first port via a selected proper subset of the plurality of first taps;
   a second winding, magnetically coupled to the first winding, the second winding having a plurality of second taps; and
   wherein the switching network couples the second winding to a second port via a selected proper subset of the plurality of second taps; and
   a transmit/receive module that couples the transformer to the receiver section in a receive mode and to the transmitter section in a transmit mode;
   wherein the control signal controls the transformer to a first impedance in the transmit mode and controls the transformer to a second impedance in the receive mode.

2. The IC of claim 1 wherein at least one of the first port and the second port, is a balanced port.

3. The IC of claim 1 wherein at least one of the first port and the second port, is an unbalanced port.

4. The IC of claim 1 wherein the transformer includes an adjustable balun.

5. The IC of claim 1 wherein the control signal controls the transformer to provide a desired load to the transmitter section in the transmit mode.

6. The IC of claim 5 further comprising:
   a load network coupled to the transmitter section, that together with the desired load, substantially matches the output impedance of the transmitter section.

7. The IC of claim 1 wherein the control signal controls the transformer to provide a desired impedance to the receiver section in the receive mode.

8. The IC interface of claim 1 further comprising:
   a control module, coupled to the transformer, that generates the control signal in response to a transmit/receive signal.

9. A programmable antenna interface for coupling an antenna to a transceiver that includes a receiver section and a transmitter section, the programmable antenna interface comprising:
   a transformer, coupled to the antenna, that is adjustable in accordance with a control signal, wherein the transformer is an on-chip transformer that includes:
   a first winding having a plurality of first taps; and a switching network that couples the first winding to a first port via a selected proper subset of the plurality of first taps;

a second winding, magnetically coupled to the first winding, the second winding having a plurality of second taps; and wherein the switching network couples the second winding to a second port via a selected proper subset of the plurality of second taps; and a transmit/receive module that couples the transformer to the receiver section in a receive mode and to the transmitter section in a transmit mode;

wherein the control signal controls the transformer to a first impedance in the transmit mode and controls the transformer to a second impedance in the receive mode.

10. The programmable antenna interface of claim 9 wherein at least one of the first port and the second port, is a balanced port.

11. The programmable antenna interface of claim 9 wherein at least one of the first port and the second port, is an unbalanced port.

12. The programmable antenna interface of claim 9 wherein the transformer includes an adjustable balun.

13. The programmable antenna interface of claim 9 wherein the control signal controls the transformer to provide a desired load to the transmitter section in the transmit mode.

14. The programmable antenna interface of claim 13 further comprising:

a load network coupled to the transmitter section, that together with the desired load, substantially matches the output impedance of the transmitter section.

15. The programmable antenna interface of claim 9 wherein the control signal controls the transformer to provide a desired impedance to the receiver section in the receive mode.

16. The programmable antenna interface of claim 15 further comprising:

a matching network coupled to the receiver section, that together with the desired impedance, substantially matches the input impedance of the receiver section.

17. The programmable antenna interface of claim 9 further comprising:

a control module, coupled to the transformer, that generates the control signal in response to a transmit/receive signal.

* * * * *